(12) United States Patent
Gagnon et al.

(10) Patent No.: US 11,166,132 B2
(45) Date of Patent: Nov. 2, 2021

(54) ENVIRONMENT CONTROL SYSTEM FOR CONTROLLING ENVIRONMENTAL CONDITIONS IN A BUILDING

(71) Applicant: Distech Controls Inc., Brossard (CA)

(72) Inventors: Dominic Gagnon, St-Bruno-de-Montarville (CA); Arthur Chretien, Lyons (FR); Marc Legault, Brossard (CA)

(73) Assignee: DISTECH CONTROLS INC., Brossard (CA)

( * ) Notice: Subject to any disclaimer, the term of this patent is extended or adjusted under 35 U.S.C. 154(b) by 50 days.

(21) Appl. No.: 15/992,686

(22) Filed: May 30, 2018

(65) Prior Publication Data

US 2019/0373425 A1   Dec. 5, 2019

(51) Int. Cl.
H04W 4/38 (2018.01)
G05B 15/02 (2006.01)
H04W 4/33 (2018.01)

(52) U.S. Cl.
CPC .............. *H04W 4/38* (2018.02); *G05B 15/02* (2013.01); *H04W 4/33* (2018.02)

(58) Field of Classification Search
CPC ........... H04W 4/33; H04W 4/38; G05B 15/02
See application file for complete search history.

(56) References Cited

U.S. PATENT DOCUMENTS

| | | | |
|---|---|---|---|
| 6,940,851 B2 | 9/2005 | Oki et al. | |
| 10,366,048 B2 * | 7/2019 | Wang | |
| 2003/0233660 A1 | 12/2003 | Slemmer et al. | |
| 2005/0270151 A1 * | 12/2005 | Winick | G08B 17/00 340/539.1 |
| 2008/0081560 A1 | 4/2008 | Jougit | |
| 2011/0269389 A1 * | 11/2011 | Scharf | F24F 13/1426 454/258 |

(Continued)

*Primary Examiner* — James P Duffy
(74) *Attorney, Agent, or Firm* — RatnerPrestia

(57) ABSTRACT

The present disclosure relates to an environment control system for controlling environmental conditions in a building. The environment control system comprises a plurality of sensors located in different areas of the building. Each sensor is used for determining a measured value for one of the environmental conditions in the area where the sensor is located. Further at least one of the plurality of sensors is configured for exchanging data with at least one mobile computing device for modifying a target value of one of the environmental conditions for the area where the sensor is located. The environment control system further comprises an environment controller for receiving the measured values and the modified target values from the plurality of sensors. The environment controller is further configured for comparing the measured values with the modified target values for each area of the building and generating commands for each area of the building based on a difference between the measured values and modified target values. The environment control system further comprises a plurality of room controllers, such that each room controller is installed in a room in one of the areas of the building. Each room controller is configured for exchanging data with the environment controller to obtain the measured values of the environmental conditions in the room.

4 Claims, 4 Drawing Sheets

(56) References Cited

U.S. PATENT DOCUMENTS

| | | | |
|---|---|---|---|
| 2014/0207869 A1* | 7/2014 | Savolainen | H04M 1/7253 |
| | | | 709/204 |
| 2014/0358285 A1 | 12/2014 | Aggarwal et al. | |
| 2015/0043425 A1 | 2/2015 | Aggarwal et al. | |
| 2015/0369505 A1* | 12/2015 | Malve | F24F 11/64 |
| | | | 700/276 |
| 2016/0323975 A1 | 11/2016 | White et al. | |
| 2017/0041070 A1 | 2/2017 | Ryan et al. | |
| 2017/0364046 A1 | 12/2017 | Westrick, Jr. et al. | |

\* cited by examiner

ENVIRONMENT CONTROL SYSTEM FOR CONTROLLING ENVIRONMENTAL CONDITIONS IN A BUILDING

TECHNICAL FIELD

The present disclosure relates to the field of environment control systems. More specifically, the present disclosure relates to an environment control system for controlling environmental conditions in a building.

BACKGROUND

Systems for controlling environmental conditions, for example in buildings, are becoming increasingly sophisticated. A control system may at once control heating and cooling, monitor air quality, detect hazardous conditions such as fire, carbon monoxide release, intrusion, and the like. Such control systems generally include at least one environment controller, which receives measured environmental values, generally from external sensors, and in turn determines set-points or command parameters to be sent to controlled appliances. Environment controllers are increasingly becoming a central and critical point of control for buildings, and their capabilities are extended beyond traditional building automation and safety functionalities.

Environment controllers may also be configured for controlling lighting related fixtures, such as a smart light fixture. A smart light fixture is a new type of light fixture capable of interacting with a mobile computing device located in proximity of the smart light fixture. For instance, a plurality of smart light fixtures is deployed in a shopping center. A particular light fixture is capable of transmitting a unique pattern (e.g. a unique identifier) used by a mobile computing device for identifying the particular light fixture. The unique pattern is used to engage a user of the mobile computing device in a marketing offer for a product located in proximity of the particular light fixture. The engagement of the user is performed via a marketing application executed on the mobile computing device, which receives the marketing offer from a remote marketing server based on the unique pattern of the particular light fixture.

Although environment controllers and smart light fixtures can be co-located in a building, they operate completely independently. There is a need for creating synergies between environment controllers and smart light fixtures, so as to optimize their respective use.

SUMMARY

In accordance with a first aspect, the present disclosure relates to an environment control system for controlling environmental conditions in a building. The environment control system comprises a plurality of sensors located in different areas of the building. Each sensor is used for determining a measured value for one of the environmental conditions in the area where the sensor is located. Further at least one of the plurality of sensors is configured for exchanging data with at least one mobile computing device for modifying a target value of one of the environmental conditions for the area where the sensor is located. The environment control system further comprises an environment controller for receiving the measured values and the modified target values from the plurality of sensors. The environment controller is further configured for comparing the measured values with the modified target values for each area of the building and generating commands for each area of the building based on a difference between the measured values and modified target values. The environment control system further comprises a plurality of room controllers, such that each room controller is installed in a room in one of the areas of the building. Each room controller is configured for exchanging data with the environment controller to obtain the measured values of the environmental conditions in the room.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to controlling environmental conditions in a building.

Terminology

The following terminology is used throughout the present disclosure:

Communication interface: device or component capable of providing communication functionalities based on a specific communication technology (for example a standardized or proprietary wired communication technology, or a standardized or proprietary wireless communication technology). A specific protocol or set of protocols corresponding to the specific communication technology is implemented by the communication interface.

Controlled appliance: device that receives a command and executes the command. The command is received from an environment controller.

Environment control device (ECD): generic name for a component of an environment control system. An ECD consists of an environment controller, a sensor, a controlled appliance, etc.

Environment controller: device capable of receiving information related to an environment and generating and sending commands based on such information.

Environment control system: a set of components which collaborate for monitoring and controlling an environment.

Environmental condition: measurable, quantifiable or verifiable physical property of an environment such as for example: temperature, humidity, lighting, number of occupants, etc.

Environmental data: any data (e.g. information, commands) related to an environment that are exchanged between components of an environment control system.

Sensor: device that detects an environmental characteristic and provides a numerical, quantitative or verifiable representation thereof. The numerical, quantitative or verifiable representation are sent to an environment controller.

Smart light fixture: a light fixture adapted for interacting with a mobile computing device located in proximity of the light fixture. For simplification purposes, in the rest of the description, when a reference is made to a light fixture, it shall be understood as a smart light fixture.

Wi-Fi: any Wireless Local Area Network (WLAN) product that is based on the Institute of Electrical and Electronics Engineers' (IEEE) 802.11 standards. However, in the rest of the description (for clarification purposes), any reference to Wi-Fi excludes the 802.11s standard which supports mesh communications over Wi-Fi. A direct mention of the 802.11s standard is used when appropriate.

Figure 1:
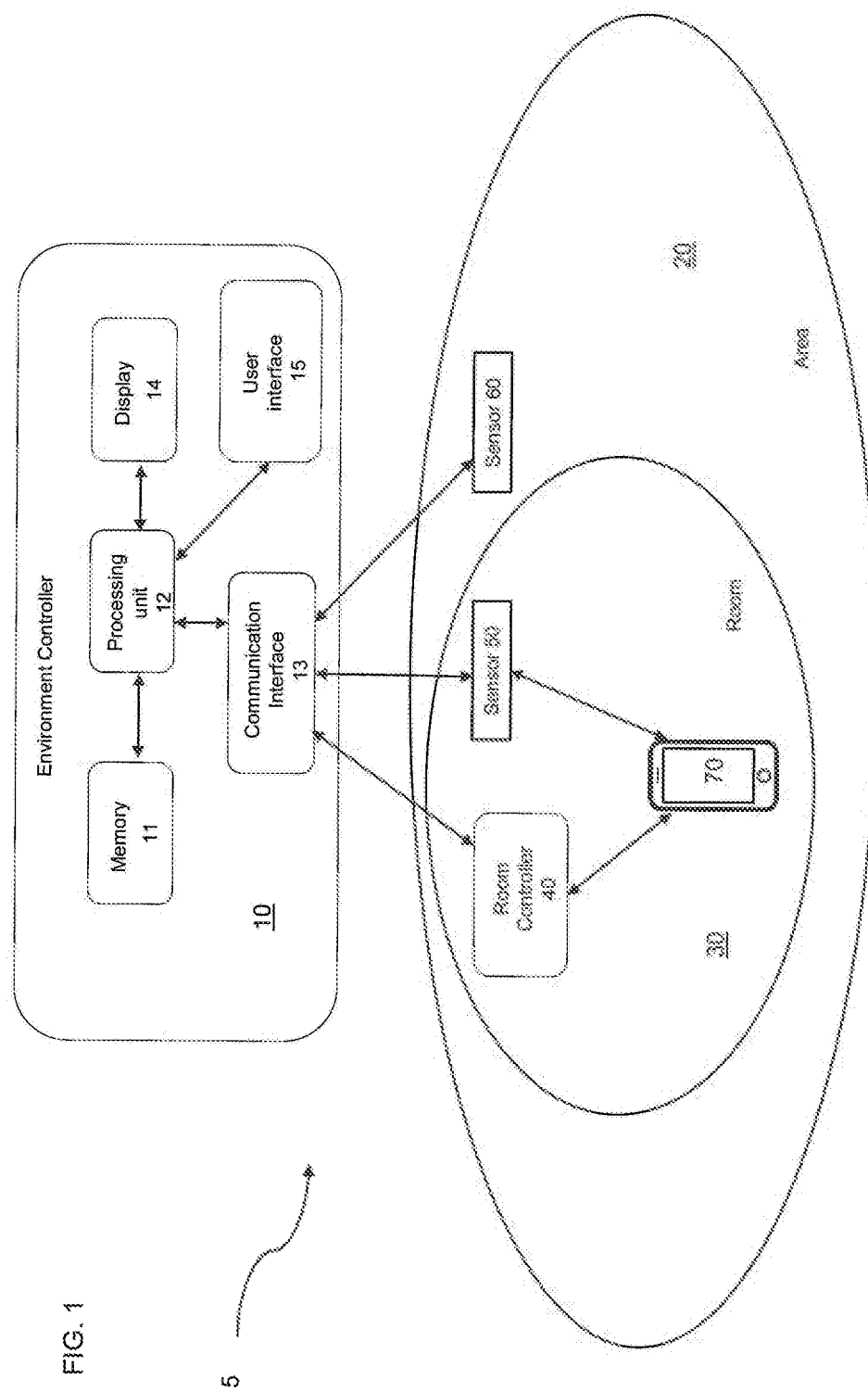
FIG. 1 illustrates a block diagram of an environment control system in accordance with an exemplary embodiment.

Referring now to FIG. 1, an environment control system 5 for interacting with mobile computing devices 70 is illustrated. Although FIG. 1 depicts only one mobile computing device, the present environment control system 5 is capable to interact with multiple mobile computing devices 70 concurrently.

The environment control system 5 includes an environment controller 10, in communication with sensors 50 and 60. Although only two sensors 50 and 60 are depicted in FIG. 1, the environment control system 5 and the environment controller 10 are adapted for interacting with numerous sensors concurrently. The environment controller 10 is also in communication with at least one room controller, shown on FIG. 1 as room controller 40. The room controller 40 and the sensor 50 are further engaged in a communication with at least one of the mobile computing device, represented on FIG. 1 as the mobile computing device 70.

The environment control system 5 is implemented in a building (not shown for simplicity purposes). The building in which the environment control system 5 is implemented is subdivided into areas 20 and rooms 30. One area 20 may include several rooms 30. For simplicity purposes, FIG. 1 shows only one area 20, and one room 30 in the area 20. However, the presented environment control system 5 is not limited to such an implementation, and area 20 could comprise one or several rooms 30, and sections of the area 20 could not be included in any room 30. The sensor 50 and the room controller 40 are positioned in the room 30 and the area 20, while the sensor 60 is positioned in the area 20. The room controller 40 may be configured for enabling control of one or more environmental conditions of the room 30, in which the room controller 40 is installed. The environmental conditions may relate to any of the following: temperature, humidity, lighting, thermostat settings, device on/off control and the like. In some example implementations, the room controller 40 may include a display for displaying a measured value and a target value of one or several of the environmental conditions in the room based on the data exchanged with the environment controller 10 and the sensor 50.

The sensor 50 may be used to modify a target value of an environmental condition by the mobile computing device 70. The mobile computing device 70 may be used to modify the target value of the environmental condition, using such as a user interface of the mobile computing device 70. The user interface of the mobile computing device 70 may be any standard user interface such as a touch-based user interface, a keypad-based interface, a joystick-based interface, a mouse-based interface, a trackball-based interface and the like.

The mobile computing device 70 may include any of a portable computer, an electronic tablet, a mobile phone and a wearable electronic device, etc.

Once the modified target value of the environmental condition in the room 30 has been inputted through the mobile computing device 70, the modified target value is sent to the environment controller 10 by the mobile computing device 70 either through the room controller 40 or through the sensor 50, depending on which of the room controller 40 and the sensor 50 is the closest to the mobile computing device 70, or has a stronger signal strength.

The environment controller 10 includes a communication interface 13 for sending and/or receiving data related to measured values and modified target values from the room controller and/or the sensors 50 and 60.

The environment controller 10 also includes a processing unit 12 for performing a plurality of operations. Each processor may further have one or several cores. The processing unit 12 executes instructions of computer program(s) for performing the functionalities of the environment controller 10: receiving measured value(s) for the environmental condition(s) from one or several sensors, receiving the modified target value(s) for one or several of the environmental conditions from the sensor, receiving the modified target value(s) for or several of the environmental conditions from the room controller 40, processing the received measured environmental conditions, processing the modified target value(s) for the environmental condition(s), transmitting the modified target value received from the sensor to corresponding room controller, transmitting the measured value of the environmental data in the room to the room controller, etc.). The environment controller 10 also includes a memory 11 for storing instructions of the computer program(s) executed by the processing unit 12, data generated by the execution of the computer program(s), data received via a communication interface 13, etc. The environment controller 10 may comprise several types of memories, including volatile memory, non-volatile memory, etc.

The environment controller 10 may comprise at least one display 14 for displaying data generated by the processing unit 12, information received via the communication interface 13 or via a user interface 15, etc. A single display 14 is represented in FIG. 1 for simplification purposes. Examples of display units 14 include tactile screens, touch screens, LCD etc.

The environment controller 10 may comprise at least one user interface 15 for allowing a user to interact therewith, for instance for configuring/reconfiguring aspects or parameters of the environment controller 10. A single user interface 15 is represented in FIG. 1 for simplification purposes. Examples of user interface(s) 15 include a trackpad, a touch screen, a keyboard, etc.

For each room 30, and for each area 20, the environment controller 10 performs a comparison of the measured values and the modified target values of each environmental condition to determine a difference therebetween on a per environmental condition, per room and per area basis. Based on the difference between the measured values and the modified target values of each environmental condition for each room and for each area, the environment controller 10 generates one or several commands to one or several controlled appliances (not shown). The commands regulate the controlled appliances which enable the environment controller 10 to reduce the difference between the measured values and the modified values of each environmental condition in one or several of the rooms 30 and/or one or several of the areas 20.

The mobile computing device 70, the room controller 40 and the sensors 50 and 60 communicate with the environment controller 10 using any of the following: a Wi-Fi network, a mesh network, a Bluetooth Low Energy (BLE) network, and a combination thereof. A particular type of mesh network which may be supported by the communication interface 13 is a mesh network based on the 802.11s standard (mesh Wi-Fi). The communication interface 13 may be adapted to support other types of networks, such as an Ethernet network, a Bluetooth network, a cellular network, etc. Each of the plurality of sensors 50 and 60 is associated with a unique identifier. For example, the unique identifier consists of a Sensor_ID or a combination of the Sensor_ID with a Sensor_management_device_ID. A mapping of each sensor's Sensor_ID with the corresponding sensor is stored in the memory 11 of the environment controller 10. Furthermore, a mapping of each sensor's Sensor_ID with the corresponding room 30 and/or area 20 is also stored in the memory 11. Multiple sensors with their respective Sensor_ID may be grouped under the supervision of one Sensor_management_device_ID. As there are typically hundreds of sensors in a building, grouping sensors per area 20, or per room 30, with a unique Sensor_management_device_ID per area 20 or per room 30 provides a simple way to manage the information received from one mobile computing device 70 by multiple sensors 50 and 60 concurrently.

Furthermore, each Sensor_management_device_ID may be handled as a subnet by the environment controller 10, or alternatively, several Sensor_management_device_IDs may be grouped as a subnet and handled as such by the environment controller 10.

The memory 11 of the environment controller 10 stores a mapping of each room controller 40 under the control of the environment controller 10 with an identification of the sensor 50 or the plurality of sensors in the corresponding room 30.

The mapping may be generated at an environment management server (not shown) and transmitted to the environment controller 10. The processing unit 12 receives the mapping via the communication interface 13 and stores the mapping in the memory 11. In a first alternative, the mapping may be generated by the environment controller 10 by a technician, or automatically generated by the processing unit 12 based on signal strengths of sensors collected in the room 30 where the room controller 40 is located. In a second alternative, the mapping is generated directly at the environment controller 10, through interactions of a user (e.g. a system administrator) with the user interface 15. For example, the processing unit 12 displays a dedicated Graphical User Interface (GUI) on the display 14, generates the mapping through the interactions of the user with the user interface 15, and stores the generated mapping in the memory 11.

In an example implementation not specifically shown, some of the sensors 50 and 60 may be co-located with a light fixture. The light fixture may be identified with a corresponding Fixture_ID, and may be configured for interaction with the environment controller 10 and the mobile computing device 70. A first type of technology used for implementing the interactions of the light fixtures with the mobile computing devices 70 consists in Visual Light Communication (VLC). Each particular light fixture includes a Light Emitting Diode (LED) transmitting a particular light pattern, which acts as a beacon for signaling a mobile computing device 70 in proximity of the particular light fixture. The particular light pattern is representative of the unique pattern of the particular light fixture. A camera of the mobile computing device 70 receives the particular light pattern, and associate the particular light pattern with the Fixture_ID for identifying the particular light fixture. In some example implementations, the identification of the light fixture may be used by marketing application executed by the mobile computing device 70 is capable of determining the unique pattern of the particular light fixture based on the received particular light pattern.

A second type of technology used for implementing the interactions of the light fixtures with the mobile computing devices 70 consists in Bluetooth Low Energy (BLE). Each particular light fixture includes a BLE interface capable of interacting with a mobile computing device 70 supporting BLE and in proximity of the particular light fixture. The unique pattern of the particular light fixture is transmitted to the mobile computing device 70 via the BLE protocol. Optionally, additional information is also transmitted via the BLE protocol. In an example implementation, the marketing application executed by the mobile computing device 70 receives the unique pattern and the optional additional information via a BLE interface of the mobile computing device 70.

Other types of technologies may be used for implementing the interactions of the light fixtures with the mobile computing device 70, as long as these technologies are supported by the light fixtures and the mobile computing device 70, and as long as these technologies support at least the transmission of the unique pattern of the light fixtures from the light fixtures to the mobile computing device 70.

In an example implementation, the light fixtures may include dedicated components for supporting their advanced interactions capabilities, such as a processing unit, memory, a communication interface for interacting with the mobile computing device 70 (e.g. a BLE interface), a controllable LED (e.g. for implementing VLC), a communication interface for interacting with the environment controller 10 etc.

In an example implementation, the information is used for engaging the users of the mobile computing devices 70 through interactions with a marketing server.

Figure 2A:
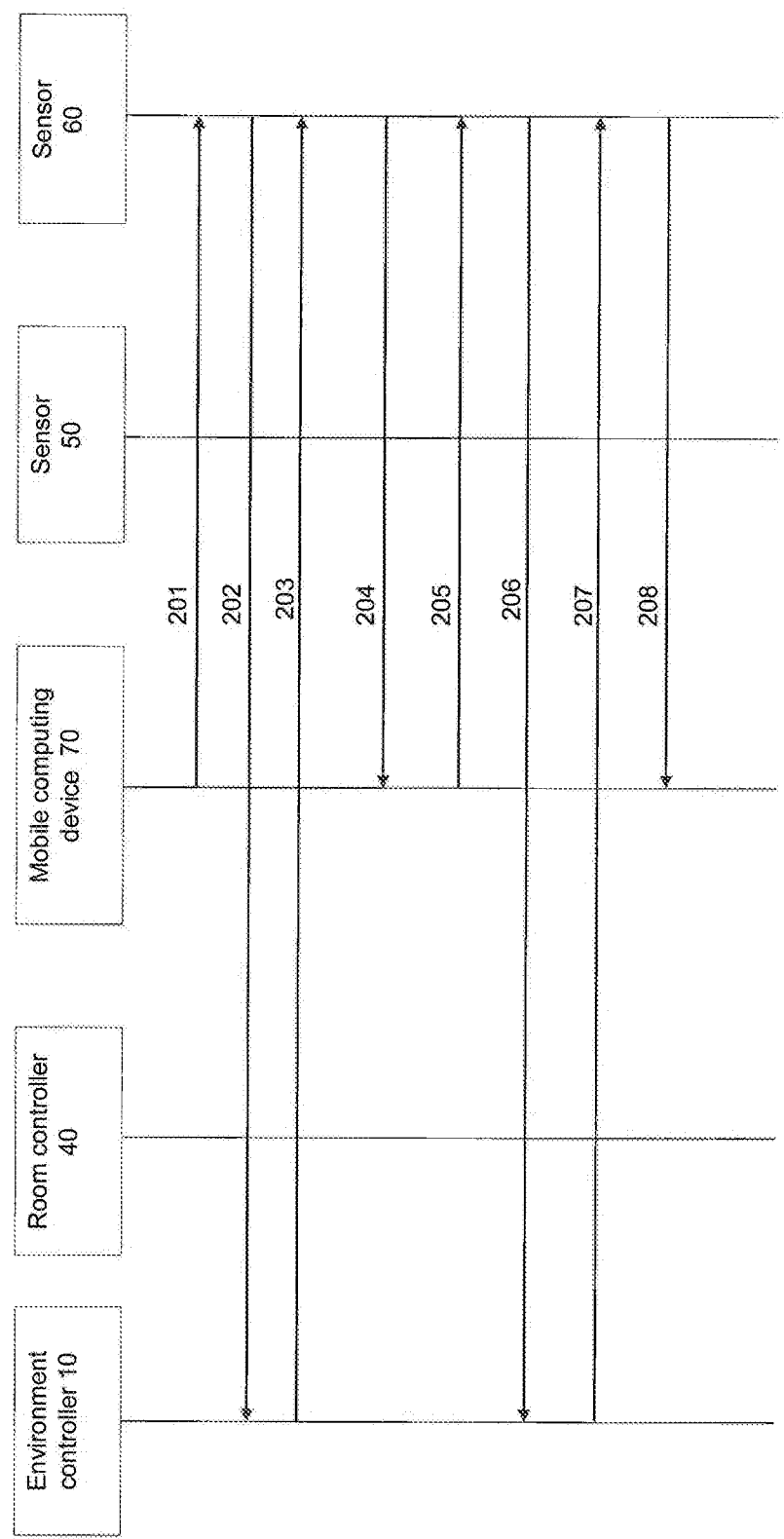
FIGS. 2A-2C illustrate three variants of interactions between an environment control system and a mobile computing device.
Figure 2B:
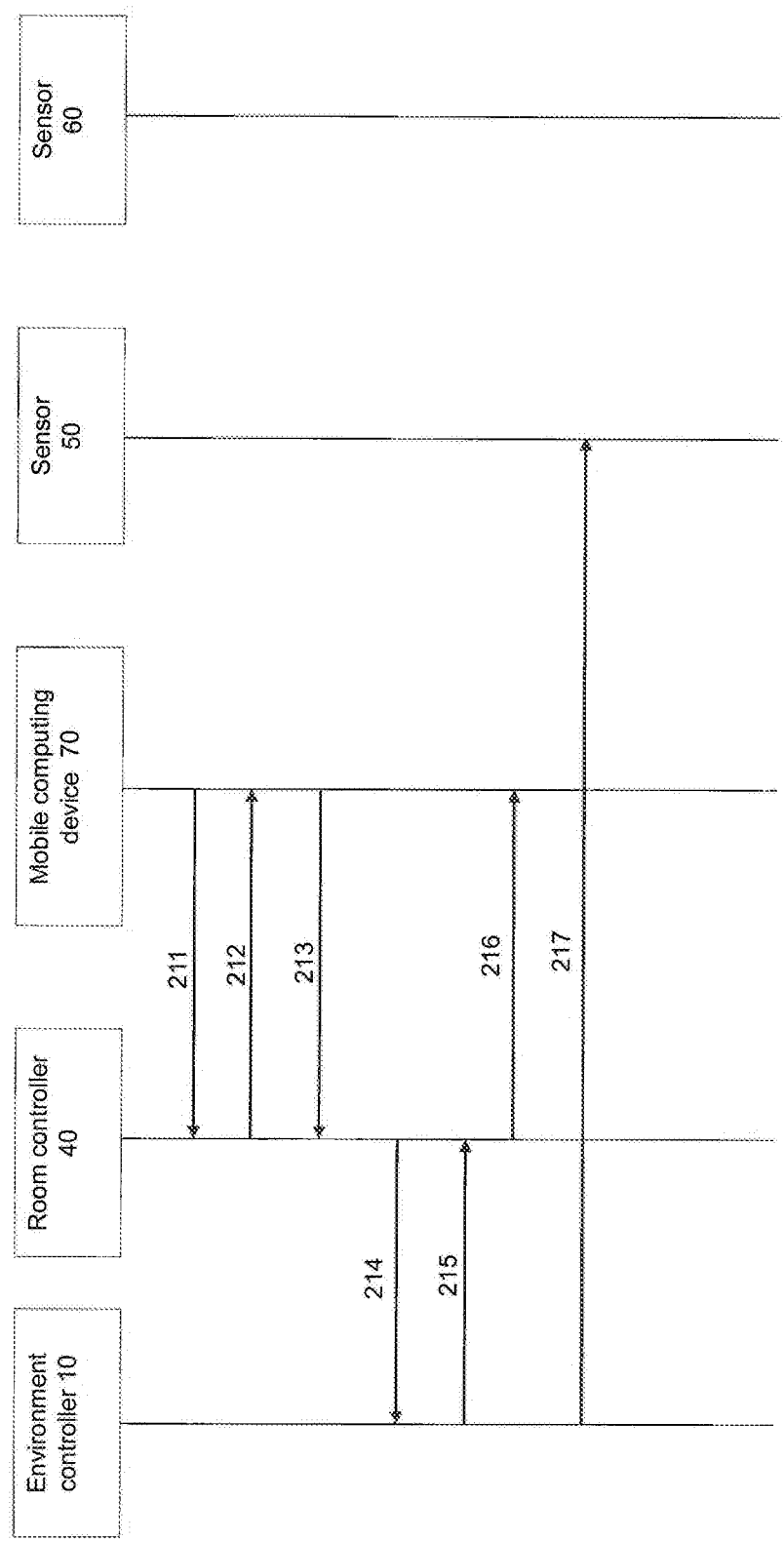
Figure 2C:
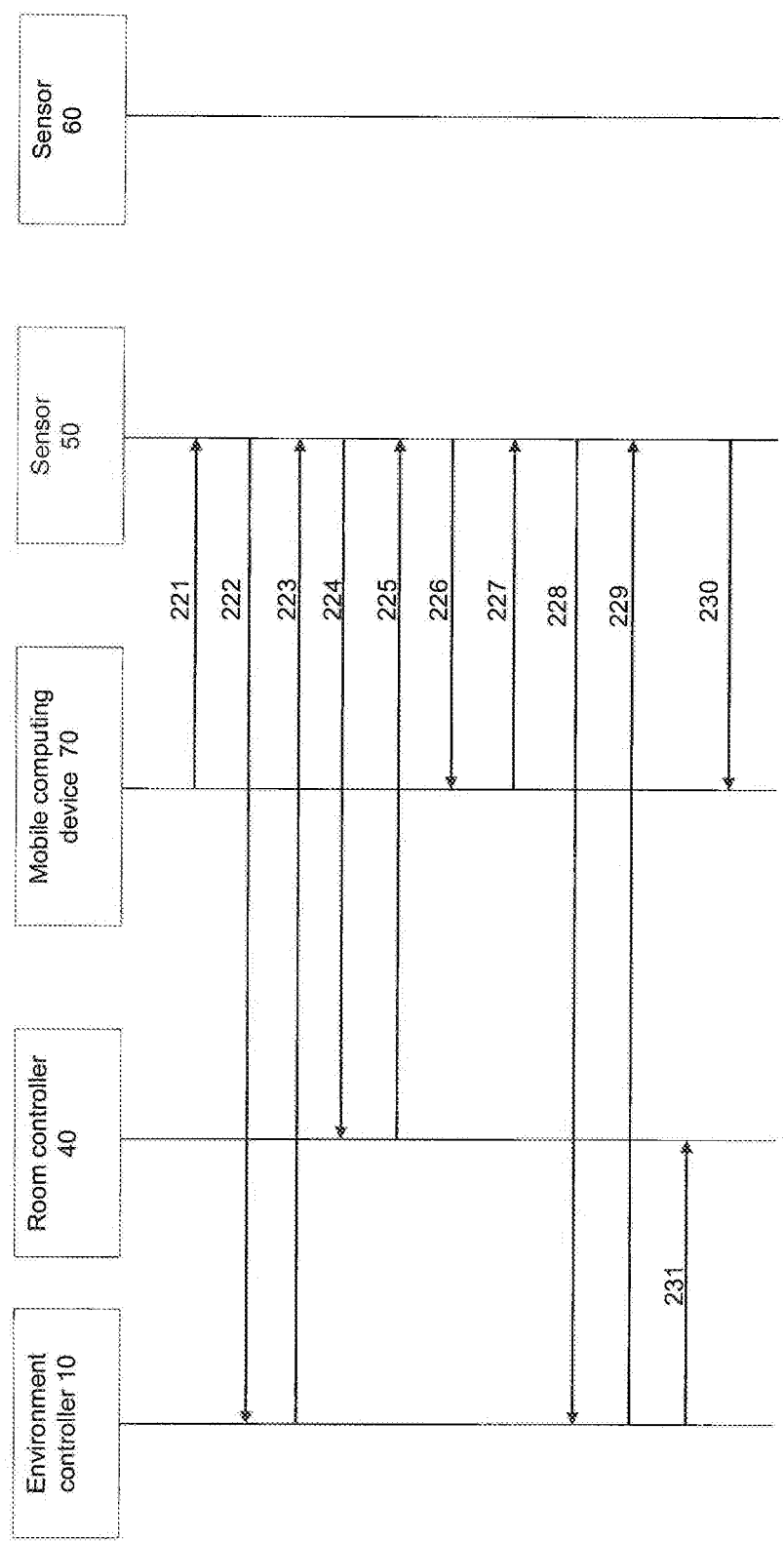

Reference is now made concurrently to FIG. 1 and FIGS. 2A-2C, where FIGS. 2A-2C illustrate three variants of interactions between the environment control system 5 and the mobile computing device 70. Although only one mobile computing device 70 is shown on FIG. 1 and FIGS. 2A-2C, the present environment control system 5 is not limited to interacting with only one mobile computing device 70 at a time. Representation of only one mobile computing device 70 in FIG. 1 and FIGS. 2A-2C is for clarify of the Figures only and should not be interpreted as a limitation of the present environment control system 5. Furthermore, for simplicity purposes, the interactions of the environment controller 10 and controlled appliances, which is performed as known in the art, have not been illustrated on FIGS. 1, and 2A-2C.

More particularly, FIG. 2A depicts an interaction of the mobile computing device 70 with the present environment control system 5 through the sensor 60, which is located in the area 20, which is not part of any room 30. In this variant, the mobile computing device 70 is located closer to the sensor 60, and therefore sends a query message 201 to the sensor 60 requesting the target values for the environmental conditions where the mobile computing device 70 is currently located. The sensor 60 generates and sends a query message 202 sent to the environment controller 10, requesting the measured values and the target values for the environmental conditions in the area 20 where the sensor 60 is located. The environment controller 10 extracts from the memory 11 the measured values and the target values for the environmental conditions in the area 20 and responds to the query message 202 with a response message 203 including the measured values and the target values for the environmental conditions in the area 20. The sensor 60 receives the response message 203 and forward the measured values and the target values for the environmental conditions in the area 20 to the mobile computing device 70 in a response message 204. The mobile computing device 70 receives the response message 204, extracts therefrom the measured values and the target values of the environmental conditions where the mobile computing device 70 is located. The mobile computing device 70 displays the measured values and the target values of the environmental conditions where the mobile computing device 70 is located through a display of the mobile computing device 70. A user of the mobile computing device 70 may consult the measured values and the target values of the environmental conditions where the mobile computing device 70 is located on the display of the mobile computing device 70 and modify one or several of the target values of the environment conditions through a user interface of the mobile computing device 70, such as for example a touch-display. The mobile computing device 70 receives from the user of the mobile computing device 70 the modified target value(s) for the environmental condition(s) and generates a command message 205 sent to the sensor 60, the command message 205 comprising the modified target value(s) for the environmental condition(s) where the mobile computing device 70 is located. The sensor 60 receives the command message 205 and extracts therefrom the modified target value(s) for the environmental condition(s) where the sensor 60 is located. The sensor 60 then generates a command message 206 sent to the environment controller 10, which comprises the modified target value(s) for the environmental condition(s) where the sensor 60 is located. The environment controller 10 receives the command message 206 and extracts therefrom the modified target value(s) for the environmental condition(s) where the sensor 60 is located. The environment controller 10 compares the measured values with the modified target values for environmental condition in the area 20, and generates commands based on a difference between the measured values and the modified target values for the environment control for the area 20, the commands being sent to the controlled appliances under the control of the environment controller 10.

In contrast, FIG. 2B depicts an interaction of the mobile computing device 70 with the present environment control system 5 through the room controller 40, which is located in the room 30 of the area 20. In this variant, the mobile computing device 70 is located closer to the room controller 40, or the signal strength measured from the room controller 40 is greater than the signal strength measured from the sensor 50 also located in the room 30. The mobile computing device sends a query message 211 to the room controller 40 requesting the target values for the environmental conditions where the mobile computing device 70 is currently located, i.e. in the room 30. The room controller 40 extracts from memory the values of the measured values and the target values for the environmental conditions in the room 30 and responds to the query message 211 with a response message 212 including the measured values and the target values for the environmental conditions in the area 20. The mobile computing device 70 receives the response message 212, extracts therefrom the measured values and the target values of the environmental conditions in the room 30 where the mobile computing device 70 is located. The mobile computing device 70 displays the measured values and the target values of the environmental conditions in the room 30 where the mobile computing device 70 is located through a display of the mobile computing device 70. A user of the mobile computing device 70 may consult the measured values and the target values of the environmental conditions in the room 30 where the mobile computing device 70 is located on the display of the mobile computing device 70 and modify one or several of the target values of the environment conditions through a user interface of the mobile computing device 70, such as for example a touch-display. The mobile computing device 70 receives from the user of the mobile computing device 70 the modified target value(s) for the environmental condition(s) and generates a command message 213 sent to the room controller 40, the command message 213 comprising the modified target value(s) for the environmental condition(s) in the room 30 where the mobile computing device 70 is located. The room controller 40 receives the command message 213 and extracts therefrom the modified target value(s) for the environmental condition(s) in the room 30 where the room controller is located. The room controller 40 then generates a command message 214 sent to the environment controller 10, which comprises the modified target value(s) for the environmental condition(s) in the room 30 where the room controller 40 is located. The environment controller 10 receives the command message 214 and extracts therefrom the modified target value(s) for the environmental condition(s) in the room 30 where the room controller 40 is located. The environment controller 10 compares the measured values with the modified target values for the environmental conditions in the room 30, and generates commands based on a difference between the measured values and the modified target values for the environment conditions for the room 30, the commands being sent to the controlled appliances under the control of the environment controller 10. The environment controller 10 confirms the modified target value(s) for the environmental condition(s) in the room 30 under the control of the room controller 40 by sending an update message 215 to the room controller 40, the update message comprising the modified target value(s) for the environmental condition(s) in the room 30, to be displayed by the room controller 40. The room controller 40 may further generate an update message 216 sent to the mobile computing device 70, the update message 216 including the modified target value(s) for the environmental condition(s) in the room 30. Additionally, the environment controller 10 may send a further update message 217 to the sensor 50, located in the room 30, to inform the sensor 50 of the modified target value(s) of the environmental condition(s) in the room 30.

FIG. 2C depicts an interaction of the mobile computing device 70 with the present environment control system 5 through the sensor 50, which is located in the room 30, which is part of the area 20. In this variant, the mobile computing device 70 is located closer to the sensor 50, and therefore sends a query message 221 to the sensor 50 requesting the measured values and the target values for the environmental conditions where the mobile computing device 70 is currently located. The sensor 50 generates and sends a query message 222 sent to the environment controller 10, requesting the measured values and the target values for the environmental conditions in the room 30 where the sensor 50 is located. The environment controller 10 extracts from the memory 11 the measured values and the target values for the environmental conditions in the room 30 and responds to the query message 222 with a response message 223 including the measured values and the target values for the environmental conditions in the room 30. Alternatively, the sensor 50 may send a query message 224 to the room controller 40 requesting the measured values and the target values for the environmental conditions in the room 30 where the sensor 50 is located. The environment controller 10 extracts from the memory the measured values and the target values for the environmental conditions in the room 30 and responds to the query message 224 with a response message 225 including the measured values and the target values for the environmental conditions in the room 30.

The sensor 50 receives the response message 223 or 225 and forwards the measured values and the target values for the environmental conditions in the room 30 to the mobile computing device 70 in a response message 204. The mobile computing device 70 receives the response message 226, extracts therefrom the measured values and the target values of the environmental conditions for the room 30 where the mobile computing device 70 is located. The mobile computing device 70 displays the measured values and the target values of the environmental conditions in the room 30 where the mobile computing device 70 is located through a display of the mobile computing device 70. A user of the mobile computing device 70 may consult the measured values and the target values of the environmental conditions of the room 30 where the mobile computing device 70 is located on the display of the mobile computing device 70 and modify one or several of the target values of the environment conditions through a user interface of the mobile computing device 70. The mobile computing device 70 receives from the user of the mobile computing device 70 the modified target value(s) for the environmental condition(s) for the room 30 and generates a command message 227 sent to the sensor 50, the command message 227 comprising the modified target value(s) for the environmental condition(s) for the room 30 where the mobile computing device 70 is located. The sensor 50 receives the command message 227 and extracts therefrom the modified target value(s) for the environmental condition(s) for the room 30 where the sensor 50 is located. The sensor 50 then generates a command message 228 sent to the environment controller 10, which comprises the modified target value(s) of the environmental condition(s) for the room 30 where the sensor 50 is located. The environment controller 10 receives the command message 228 and extracts therefrom the modified target value(s) of the environmental condition(s) for the room 30 where the sensor 50 is located. The environment controller 10 compares the measured value(s) with the modified target value(s) for the environmental condition(s) in the room 30, and generates commands based on a difference between the measured values and the modified target values for the environment control for the room 30, the commands being sent to the controlled appliances under the control of the environment controller 10. The environment controller 10 further sends a confirmation message 229 to the sensor 50, confirming the modification of the target value(s) of the environmental condition(s) in the room 30 where the sensor 50 is located. The sensor 50 may confirm the modification of the target value(s) of the environmental condition(s) in the room 30 to the mobile computing device by generating and sending an update message 230 providing the modified target value(s) for the environmental condition(s) in the room 30. Additionally, the environment controller 10 sends an update message 231 to the room controller 40 to inform the room controller 40 of the modified target value(s) for the environmental condition(s) in the room 30 where the room controller 40 is located.

To communicate with the environment control system 5, and more particularly with the sensors 50 and 60, and the room controller 40, the mobile computing device 70 executes code corresponding to an application downloadable from a website, or access a website of the building through which the mobile computing device communicates with the closest sensor 50 and 60 or the room controller 40.

Although the present disclosure has been described herein above by way of non-restrictive, illustrative embodiments thereof, these embodiments may be modified at will within the scope of the appended claims without departing from the spirit and nature of the present disclosure.

What is claimed is:

1. A method for controlling environmental conditions in a building, the method comprising:

sending by a mobile computing device a query message requesting measured values and target values of the environmental conditions for a room where the mobile computing device is located to a sensor near the mobile computing device, the sensor being independent of a room controller for the room;

upon receipt of the query message from the mobile computing device by the sensor, generating and sending by the sensor a query message to an environment controller requesting the measured values and the target values of the at least one environmental conditions where the mobile computing device is currently located;

extracting by the environment controller the measured values and the target values of the environmental conditions in a room where the sensor is located and responding with a response message including the measured values and target values of the environmental conditions in the room;

receiving by the sensor the response message from the environment controller and forwarding in a response message the measured values and target values for the environmental conditions in the room to the mobile computing device;

receiving by the mobile computing device the response message from the sensor;

extracting by the mobile computing device the measured values and target values of the environmental conditions for the room where the mobile computing device is located and displaying the measured values and target values of the environmental condition for the room where the room where the sensor and the mobile computing device are located on a display of the mobile computing device;

receiving through a user interface of the mobile computing device a modified target value for at least one of the environmental condition for the room where the mobile computing device is located and generating by the mobile computing device and sending to the sensor a command message comprising the modified target value of the at least one environmental condition;

receiving by the sensor the command message extracting by the sensor the modified target value of the at least one environmental condition for the room where the sensor is located from the command message;

generating by the sensor a command message for the environment controller comprising the modified target value of the at least one environmental condition for the room where the sensor is located;

receiving by the environment controller the command message from the sensor and extracting the modified target value for the at least one environmental condition for the room where the sensor is located;

comparing by the environment controller the measured value with the modified target value for the at least one environmental condition in the room and generating a command for at least one controlled appliance controlled by the environment controller based on a difference between the measured value and the modified target value for the room;

sending by the environment controller a confirmation message to the sensor confirming modification of the target value for the at least one environmental condition for the room where the sensor is located; and generating and sending by the sensor an update message providing the modified target value for the at least one environmental condition for the room to the mobile electronic device.

2. The method of claim 1, wherein the environment controller further sends an update message to a room controller of the room where the sensor is located informing the room controller of the modified target value for the at least one environmental condition in the room.

3. The method of claim 1, wherein the room controller further comprises a display for displaying the measured value of one of the environmental conditions in the room based on the data exchanged with the environment controller.

4. The method of claim 1, wherein the sensor is co-located with a light fixture.

* * * * *